March 13, 1962

P. F. FERREIRA 3,025,027

VERTICAL AIRFOIL

Filed Feb. 21, 1961

Paul Franklyn Ferreira
INVENTOR.

March 13, 1962 P. F. FERREIRA 3,025,027
VERTICAL AIRFOIL

Filed Feb. 21, 1961 4 Sheets-Sheet 2

Paul Franklyn Ferreira
INVENTOR.

March 13, 1962 P. F. FERREIRA 3,025,027
VERTICAL AIRFOIL
Filed Feb. 21, 1961 4 Sheets-Sheet 3

Paul Franklyn Ferreira
INVENTOR.

BY *Clarence A. O'Brien*
and *Harvey B. Jacobson*
Attorneys

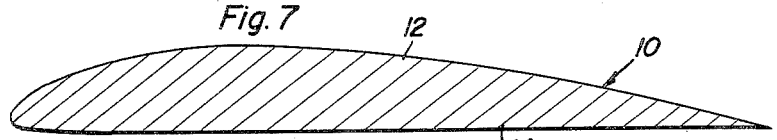
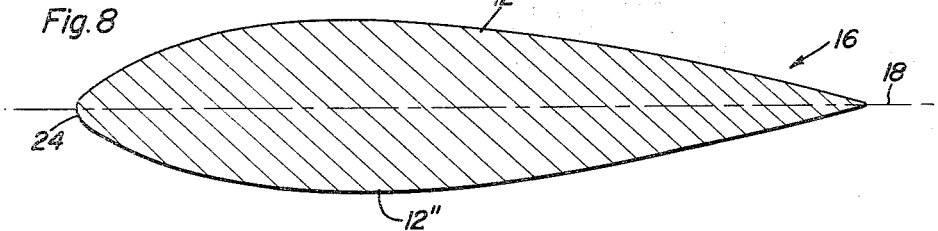
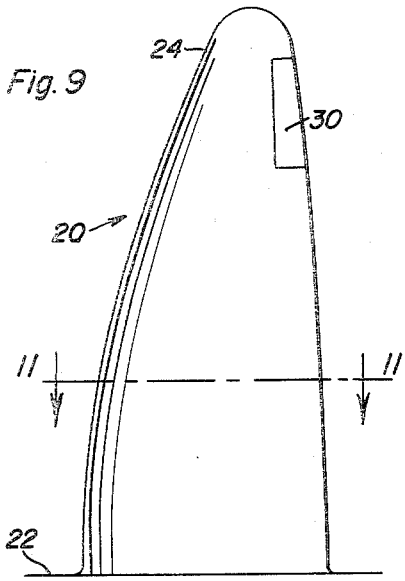
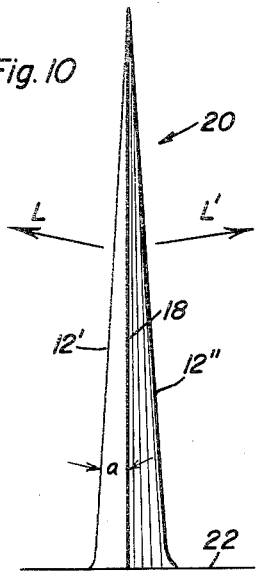
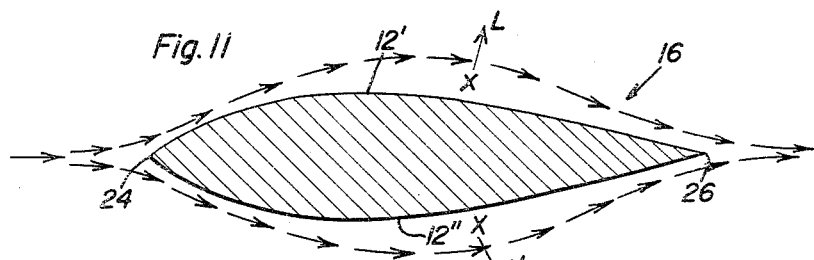
Paul Franklyn Ferreira
INVENTOR.

United States Patent Office 3,025,027
Patented Mar. 13, 1962

3,025,027
VERTICAL AIRFOIL
Paul Franklyn Ferreira, P.O. Box 111, Honolulu, Hawaii
Filed Feb. 21, 1961, Ser. No. 90,818
2 Claims. (Cl. 244—91)

This invention relates to airfoils, and more particularly to a vertically extending airfoil on an aircraft for supplementing or replacing the conventional wing.

Briefly, the invention comprises a vertically extending airfoil or wing having a symmetrical cross section and located longitudinally of the aircraft so as to be in the general area of the center of gravity thereof. The airfoil is substantially thicker at its base than at its tip so as to have an upwardly tapered or triangular shape as viewed from the front of the aircraft. The airfoil thus produces a lift which may be used to supplement or replace the conventional wings of the aircraft. Due to the symmetrical cross sectional shape of the airfoil, it is much more streamline than conventional wing sections, and therefore produces a minimum of drag. The airfoil may also be used as an engine mount, or as a supporting structure for an air brake.

It is therefore a primary object of this invention to provide a vertically extending airfoil for producing lift and supporting an aircraft in flight It is another object of the invention to provide a vertically extending airfoil which produces lift with a minimum amount of drag, and is therefore more efficient than conventional airfoils.

It is still another object of this invention to provide a vertically extending airfoil which is also adapted to function as a support for a power plant or an air brake in addition to serving as a lifting device.

It is still another object of the invention to provide a vertically extending airfoil which has an aileron on its upper trailing edge controllable from the cockpit of the aircraft for controlling the roll thereof about its longitudinal axis.

It is still another object of this invention to provide an airfoil which is much thicker at its base portion than at its tip portion so as to have upwardly converging opposite side walls thereby making the airfoil much stronger and more rigid and causing the lift forces on opposite sides of the airfoil to have a substantial vertical component.

It is still another object of this invention to provide a vertical airfoil or wing for the aircraft which operates to produce a new type of lift force, that is, a suspension type of lift force instead of the direct lift force.

It is still another object of the invention to provide a vertically extending airfoil for an aircraft that has a symmetrical cross sectional shape thereby eliminating the drag produced on the flat underside of the conventional wings.

It is yet another object of this invention to provide an aircraft with a vertically extending wing which is half of the length of conventional wings that would normally be used on the aircraft, and yet performs a lift equivalent to that which was created by the conventional horizontal wing.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 7 illustrates a conventional airfoil section;

FIGURE 8 is an enlarged cross sectional view of the symmetrical airfoil used in my vertical wings;

FIGURE 9 is a side elevational view of one form of my vertical wing employing an aileron;

FIGURE 10 is a front elevational view of FIGURE 9; and

FIGURE 11 is a cross sectional view taken substantially on the plane of line 11—11 of FIGURE 9.

Figure 1:
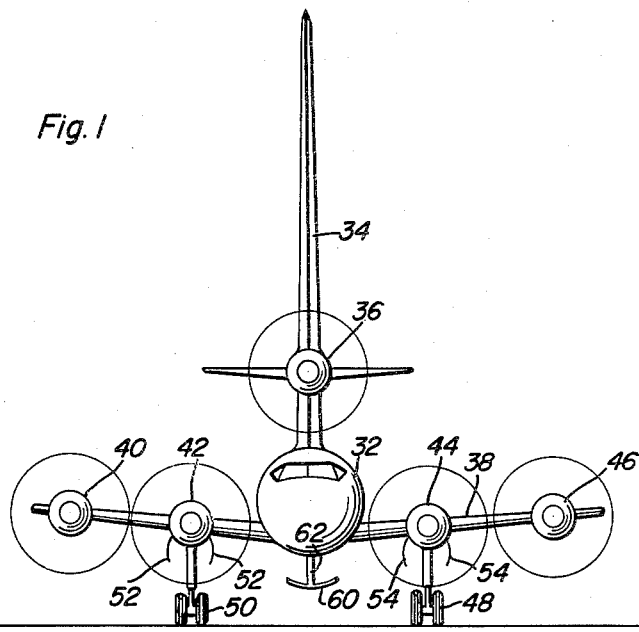
FIGURE 1 is a front elevational view of an aircraft employing my invention.

As shown in FIGURE 7, a conventional airfoil 10 has a curved upper surface 12 and a flat lower surface 14. The airfoil section 10 is typical of those used in the horizontally extending wings of conventional aircraft.

As shown in FIGURE 8, the symmetrical airfoil section 12 employed in my invention comprises two of the conventional airfoil sections 10 joined together by placing them opposite and adjacent one another so that the flat surfaces 14 thereof lie along the symmetrical center lines 18. The opposite sides of the airfoil section 16 are equally curved as shown at 12′ and 12″.

As shown in the side elevational view of FIGURE 9, a vertical airfoil 20 is designed to be attached to the upper surface 22 of an aircraft fuselage so as to lie substantially over the center of gravity of the aircraft. The section shown in FIGURE 8 is taken substantially on the plane of line 11—11 in FIGURE 9. As shown in FIGURE 10, the base of the airfoil 20 is much thicker than its tip thereby causing the curved surfaces 12′ and 12″ to each form an angle $a$ at its thickest portion with the vertically extending plane 18 which bisects the airfoil.

Referring to FIGURE 11, which shows air flowing over the airfoil sections 16 from the leading edge 24 thereof to the trailing edge 26 thereof. As the air flows over the thickest portion of the curved surfaces 12′ and 12″, its velocity increases and thereby causes a reduced pressure air or partial suction to be created in the general vicinity of the two X's shown in FIGURE 11. This suction or reduced pressure that is produced on each side of the airfoil 16 occurs in substantially the same manner as the suction or reduced pressure that is produced on the upper surfaces of conventional horizontal wings such as that illustrated in FIGURE 7. This suction or reduced pressure in the vicinity of the X's shown in FIGURE 11, produces a suspension type of lift as indicated by the letters L and L′. As shown in FIGURES 10 and 11, these lift forces act normal to the surfaces of the airfoil. This elongated vacuum area causing the lift forces extends from the vicinity of the airfoil tip to the fuselage and is dependent upon the degree of camber of the airfoil surface which causes suction force normal to the surface of the airfoil, or a suspension lift force for the aircraft.

As can be seen in FIGURE 10, the side surfaces of the airfoil 20 diverge in a downward direction toward the fuselage surface 22. Since the lift force L and L′ are normal to the surfaces 12′ and 12″ on each side of the airfoil, these lift forces act upwardly and outwardly perpendicular to the airfoil surfaces. From an inspection of FIGURE 10, it can easily be seen that the lift forces L and L′ have a vertical component of a substantial degree. The vertical component of the forces L and L′ may be increased in direct proportion to the increase of the angle $a$. In addition to causing the lift forces to act in an upward direction, the tapered configuration of the airfoil section 20 also greatly increases the strength thereof since it is much thicker at its base than at its tip, and the base of the airfoil is that portion thereof which receives the greatest stress.

The lift developed by my perpendicular airfoil is equivalent to that produced by horizontal wing of conventional design and which is twice as long as my vertical airfoil is high. This is evident because the conventional wing produces a suctional lift force only on one side thereof as explained above in reference to FIGURE 7. As explained above, my vertical wing or airfoil produces lift on both sides thereof, and at the same time eliminates the drag produced by the flat under surface of the conventional wing.

As shown in FIGURE 9, the vertical wing or airfoil 20 may contain a control surface 3 pivoted at its forward portion to the wing and controlled from the cockpit by the pilot in a manner similar to a conventional aileron on a typical horizontal wing.

Figure 2:
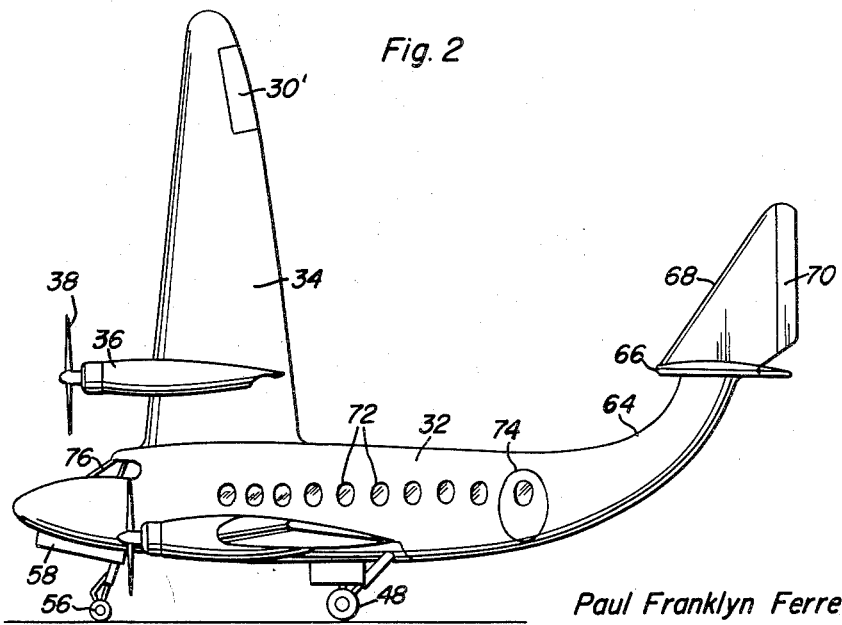
FIGURE 2 is a side elevational view of the form shown in FIGURE 1.

Referring to FIGURES 1 and 2, an aircraft having a fuselage 32 has a vertical wing 34 extending upwardly from the forward central portion of the fuselage. This vertical wing also has an aileron or controllable surface 30' similar to the surface 30 shown in FIGURE 9.

In this form of my invention, the vertical wing also acts as a support for a conventional power plant 36 which drives a propeller 38 for pulling the aircraft forward.

Mounted below the vertical airfoil 34 and extending substantially horizontally is a short wing 38 which supports four additional conventional power plants 40, 42, 44 and 46 all driving conventional propellers. The horizontal supporting structure 38 also has a conventional airfoil section similar to that shown in FIGURE 7. The structure 38 also acts as a support for retractable landing gear 48, 50 and which are concealed by retractable doors 52 and 54.

The nose wheel 56 of the aircraft is also retractable. However, this wheel retracts into the nose portion of the fuselage and is covered by doors 58 when retracted. The doors 52, 54 and 58 are all operated by conventional hydraulic means, not shown.

When the aircraft becomes airborne or reaches high speed flight, it may be maneuvered into an upside-down position so that the vertical wing points to the ground with the fuselage on top. A mechanical platform 60 may be attached to the fuselage bottom portion by means of a supporting member 62 which is operated by some power means, not shown, for retracting and extending the platform 60. When the aircraft is in an inverted flight position, the platform 60 may be used for launching missiles, covering or exchanging items with other aircraft, and other uses in conformity therewith.

The rear portion of the fuselage 32 curves upwardly at 64 so that its end is horizontal and acts as a support for the horizontally extending tail portion 66. Mounted on top of the tail portion 66 is a rudder 68 having a controllable surface 70 pivotally connected thereto in its forward edge. The tail surface 66 and the rudder 68 are mounted directly behind the power plant 36 and propeller 38 so as to be directly in alignment with the prop blast or prop wash from this propeller. This provides a more efficient control of the aircraft while on the ground and while taxiing.

The fuselage 32 also contains conventional windows 72, door 74 and windshield 76.

While the vertical airfoil 34 functions as a primary lifting means for an aircraft, the horizontal structure 38 functions primarily as a supporting structure for the engine and landing gear of the aircraft, although this structure does assist to a certain degree in lifting the aircraft. When the aircraft is flying upside down, it is flying at a very high speed and the nose of the fuselage may be elevated so as to cause the fuselage 32 and supporting structure 38 to develop substantial lifting forces.

The vertical wing or airfoil 34 is located substantially over the center of gravity of the aircraft so as to support most of the weight thereof and thereby freeing the airfoils 66 and 38 from the necessity of creating any great lifting forces.

Figure 3:
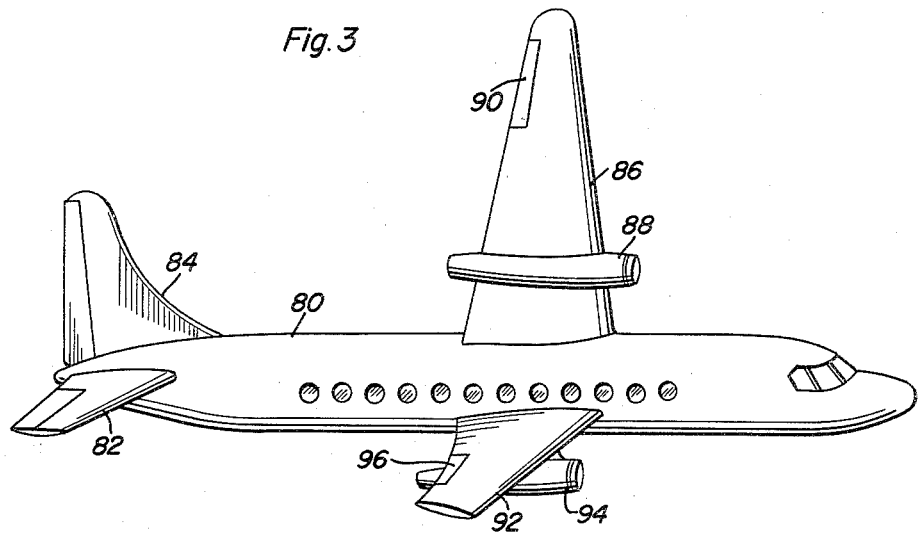
FIGURE 3 illustrates a side elevational view of a second form of my invention.

The aircraft shown in FIGURE 3 is quite conventional and comprises fuselage 80 having conventional tail surfaces 82 and rudder 84. The vertical airfoil 86 is mounted over the center of gravity of the aircraft and is shaped substantially like an equilateral triangle. It supports a conventional jet engine 88 and has a controllable surface 90 at its upper trailing edge. This form of the invention will also have a very short horizontal wing surface 92, each half thereof supporting a conventional jet engine 94 and having a conventional aileron 96 controlled from the cockpit. The control surface 90 being much further from the longitudinal roll axis of the aircraft, is more effective than the aileron 96 for rolling the aircraft since it has more leverage.

Figure 4:
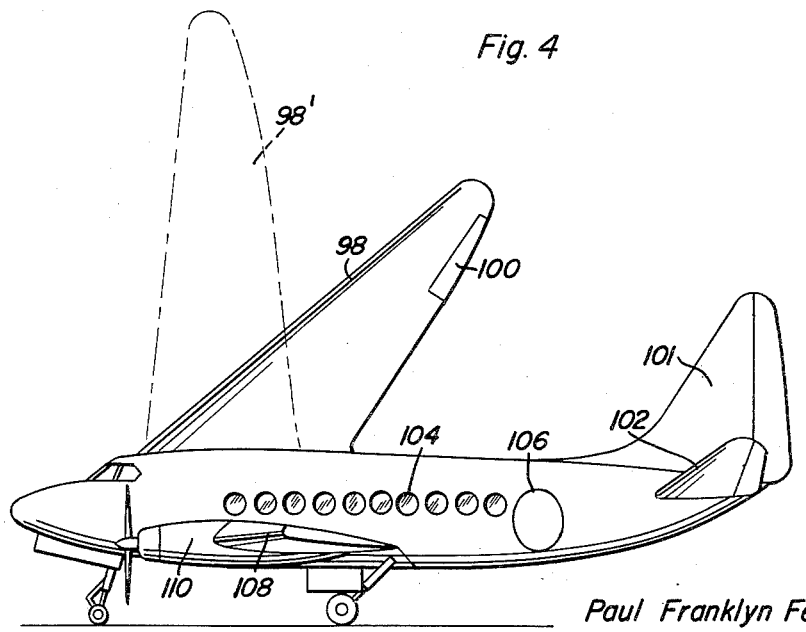
FIGURE 4 illustrates a side elevational view of a third form of my invention.

The form of my invention shown in FIGURE 4 illustrates a vertical airfoil 98 which has a substantial sweep back rather than being vertical as the more conventional vertical airfoil illustrated in dotted lines at 98'. Having the airfoil swept back, it increases the efficiency of the aircraft at high speeds. This airfoil 98 also has a control surface 100 controlled from the cockpit by the pilot. The aircraft also has conventional tail surfaces 101 and 102 as well as conventional landing gear, conventional windows 104 and door 106. This aircraft also has a very short wing 108 extending horizontally for supporting conventional power plants 110.

Figure 5:
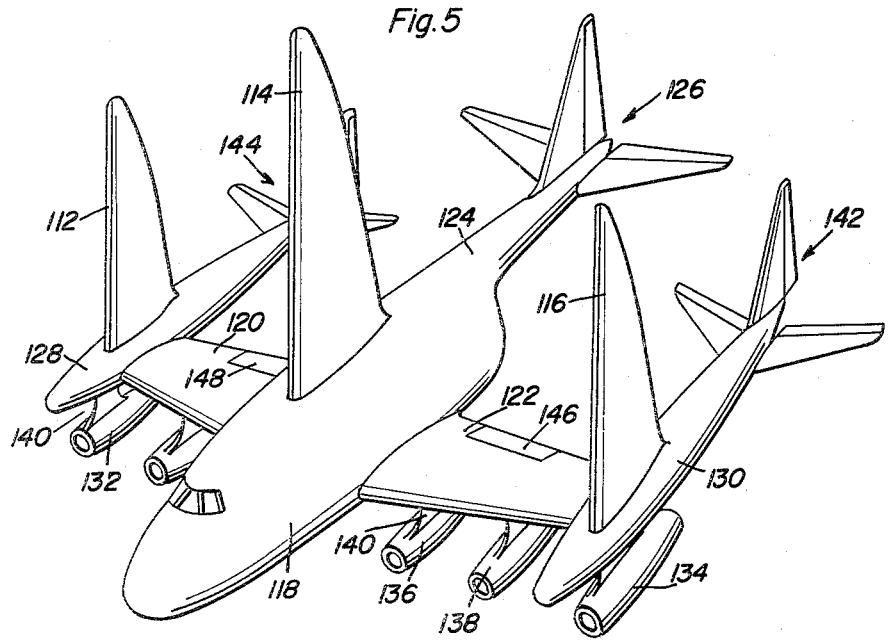
FIGURE 5 illustrates a perspective view of a fourth form of my invention.

FIGURE 5 illustrates an aircraft using three vertical airfoils 112, 114, and 116. The airfoil 114 is mounted on the upper forward portion of the fuselage 118 in the conventional manner, while the airfoils 112 and 116 are mounted on the tips of very short horizontally extending semi-spans 120 and 122, and the fuselage has a boom 124 supporting a conventional tail 126. The ends of the similar spans 120 and 122 are connected to the vertical airfoil 112 and 116 by means of streamlined booms 128, 130. The streamline booms 128 and 130 also support conventional jet engines 132 and 134 respectively. Each of the semi-spans 120 and 122 also support two jet engines each as shown at 136 and 138. All of the jet engines are suspended by means of streamline supports 140. Each of the streamline booms 128 and 130 support additional tail assemblies 142 and 144. In operation, the lift of the plane is primarily produced by the vertical airfoils 112, 114 and 116, however the short semi-spans 120 and 122 in addition to supporting the engines and booms 128 and 130 also assist in creating a lift. The three tail assemblies 124, 152 and 126 are all synchronously connected so as to be simultaneously controlled when in the identical manner by the pilot. Ailerons 146 and 148 are also controlled in a conventional manner.

Figure 6:
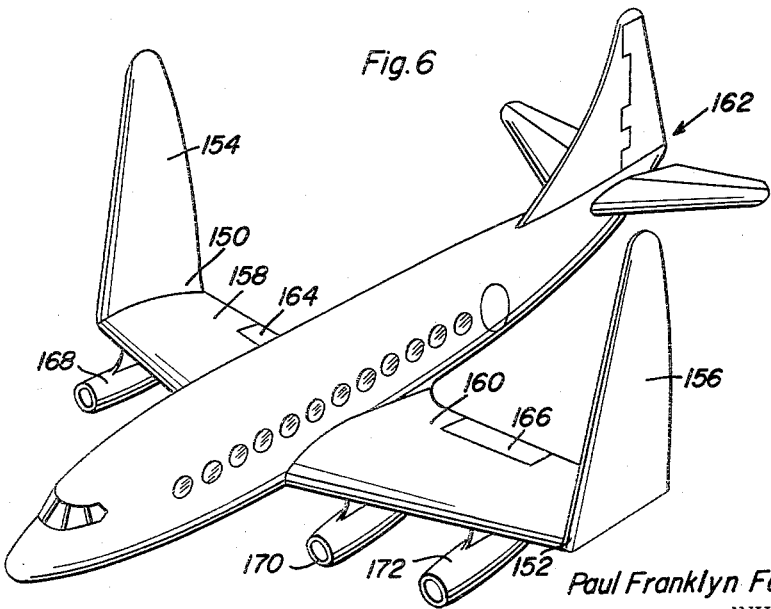
FIGURE 6 is a perspective view of a fifth form of my invention.

The aircraft shown in FIGURE 6 is also quite conventional except that the normal horizontally extending wings are projected upwardly at 150 and 152 to form vertical wing sections 154 and 156 respectively. These relatively long vertical wing sections are supported by quite short horizontal sections 158 and 160. The aircraft is controlled by a conventional tail assembly 162 and ailerons 164 and 166. The fuselage has conventional windows and doors in a windshield as illustrated in FIGURE 4. The relatively short wing sections 158 and 160 also support four conventional jet engines, three of which are shown at 168, 170 and 172.

The type of vertical wing explained above has been subjected to several flight tests, demonstrating the suspension lift force which was found to be greater than the lift force developed by the horizontal wing twice the span of the vertical wing. The theory of flight for aircraft heavier than air supports my invention.

By mounting the vertical airfoil entirely on the fuselage as illustrated in FIGURES 3 and 4, and by mounting the power plants on the vertical wing and fuselage, it is quite possible to eliminate the short horizontal wings entirely, or else have the horizontal wings retractable thereby using them for special occasions when slow flight is desired such as landing and taking off.

The drawings are not drawn to any particular scale. The vertical wings shown in FIGURES 3-6 are preferably considerably higher than is the length of each semi-span of the horizontal wing.

The horizontal wings such as 120, 122 shown in FIGURE 5 have a positive angle of incidence causing a pressure above atmospheric to be created below the wings. This creates an additional lift force supplementing the lift forces caused by the vacuum produced above the horizontal wings and on each side of the vertical wings.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An aircraft comprising a fuselage, a generally horizontally extending streamlined support structure extending outwardly from the opposite sides of the fuselage at the center of gravity thereof, flight control surfaces on said fuselage spaced from said center fo gravity, vertical airfoil means fixed to said fuselage for producing a lifting force the sum of which is located substantially over said center of gravity, propulsion means carried by said support structure, said vertical airfoil means including a vertical, upwardly tapered airfoil at each end of said support structure, said support structure being shaped in cross-section so as to produce lift when moving through fluid.

2. An aircraft as defined in claim 1 wherein said vertical airfoil means further includes another vertical airfoil extending upwardly from said fuselage above said support structure.

References Cited in the file of this patent
UNITED STATES PATENTS

| | | |
|---|---|---|
| 1,881,034 | Smith | Oct. 4, 1932 |
| 2,120,065 | De Rouge | June 7, 1938 |
| 2,941,754 | Bouffort | June 21, 1960 |